United States Patent
Aimura et al.

(10) Patent No.: US 9,030,560 B2
(45) Date of Patent: May 12, 2015

(54) APPARATUS FOR MONITORING SURROUNDINGS OF A VEHICLE

(75) Inventors: Makoto Aimura, Saitama (JP); Nobuharu Nagaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 420 days.

(21) Appl. No.: 13/700,289

(22) PCT Filed: May 30, 2011

(86) PCT No.: PCT/JP2011/003007
§ 371 (c)(1),
(2), (4) Date: Nov. 27, 2012

(87) PCT Pub. No.: WO2011/155152
PCT Pub. Date: Dec. 15, 2011

(65) Prior Publication Data
US 2013/0070098 A1   Mar. 21, 2013

(30) Foreign Application Priority Data

Jun. 7, 2010   (JP) .................. 2010-129841

(51) Int. Cl.
*H04N 9/18* (2006.01)
*G08G 1/16* (2006.01)
*G06T 7/00* (2006.01)

(52) U.S. Cl.
CPC ............. *G08G 1/166* (2013.01); *G06T 7/0042* (2013.01); *G06T 2207/30261* (2013.01); *G06T 7/0083* (2013.01); *G06T 2207/10048* (2013.01)

(58) Field of Classification Search
None
See application file for complete search history.

(56) References Cited

U.S. PATENT DOCUMENTS

| | | | |
|---|---|---|---|
| 2005/0105770 A1* | 5/2005 | Sumitomo et al. | 382/103 |
| 2005/0232491 A1* | 10/2005 | Chang et al. | 382/199 |
| 2006/0126897 A1* | 6/2006 | Nagaoka et al. | 382/103 |
| 2006/0126898 A1* | 6/2006 | Nagaoka et al. | 382/103 |
| 2011/0109739 A1* | 5/2011 | Aimura et al. | 348/135 |
| 2011/0234805 A1* | 9/2011 | Matsuda et al. | 348/148 |

FOREIGN PATENT DOCUMENTS

| | | | |
|---|---|---|---|
| JP | 08-313632 A | 11/1996 | |
| JP | 2000-030197 A | 1/2000 | |
| JP | 2003-216937 A | 7/2003 | |
| JP | 2004-303219 A | 10/2004 | |
| JP | 2006-185434 A | 7/2006 | |
| JP | 4128562 B2 | 7/2008 | |

(Continued)

OTHER PUBLICATIONS

European Search Report dated Nov. 21, 2013.

*Primary Examiner* — Amara Abdi
(74) *Attorney, Agent, or Firm* — Carrier Blackman & Associates, P.C.; Joseph P. Carrier; William D. Blackman (57) ABSTRACT

The vehicle surroundings monitoring apparatus is provided with an imaging device and a device that transforms captured image to digital image. A first edge extraction mask is applied to detect multiple horizontal edges. The apparatus further includes a detector that detects upper end of the head of the object by detecting a horizontal edge having a highest edge intensity out of the multiple horizontal edges. A second edge extraction mask is used to detect the lower end of the head of the physical object by detecting multiple vertical edges and matching the positional variation of the multiple vertical edges with predetermined patterns.

13 Claims, 5 Drawing Sheets

(56) References Cited

FOREIGN PATENT DOCUMENTS

| | | |
|---|---|---|
| JP | 2009-048558 A | 3/2009 |
| JP | 2009-301242 A | 12/2009 |
| WO | 2009/064227 A1 | 5/2009 |
| WO | 2010/007718 A1 | 1/2010 |
| WO | 2010/047055 A1 | 4/2010 |

* cited by examiner

APPARATUS FOR MONITORING SURROUNDINGS OF A VEHICLE

FIELD OF THE INVENTION

The present invention relates to an apparatus for monitoring surroundings of a vehicle, in particular for detecting a head region of a physical object including a pedestrian from among images captured by an imaging device mounted on a vehicle.

RELATED ART

Patent document 1 discloses a surroundings monitoring device for monitoring surroundings of a vehicle. In the surroundings monitoring device, a part (e.g., a head) of a physical object (e.g., a pedestrian) to be monitored is identified from a position of a horizontal edge obtained by applying an edge filter to images captured by an imaging device mounted on a vehicle.

PRIOR ART DOCUMENT

Patent Document 1: JP 4128562 A

SUMMARY OF THE INVENTION

Problem to be Solved

The monitoring device disclosed in Patent Document 1 takes an approach in which a distance to the physical object is calculated by finding a parallax of the physical object in right and left images acquired by a pair of left and right infrared cameras (stereo cameras), and a region (a mask region) within which the physical object to be monitored on the images is included using distance information.

Therefore, where a single infrared camera is used, accurate distance information cannot be obtained, and in some cases, a mask region might not be set properly on the image.

Further, mounting of two cameras increases cost, and requires such works as adjustment of an optical axis of the both cameras.

In recent years, an algorism is proposed, which uses a head size of a pedestrian for determining whether a pedestrian around a vehicle is an adult or a child in a process before a distance is calculated. There is a need for a scheme for calculating the head size of a pedestrian without using distance information.

Accordingly, an objective of the present invention is to mitigate or resolve the problems imminent in the prior art, i.e., to detect accurately a head region of a physical object (e.g., a pedestrian) in images with improved precision without using the distance information between the vehicle and the physical object.

Solution to the Problem

The present invention provides an apparatus for monitoring surroundings of a vehicle. The apparatus comprises an imaging device that is mounted on a vehicle and acquires an image around the vehicle, a multi-valuing device that transforms a grayscale image captured by the imaging device to multi-value image, and a horizontal edge detection device that applies a first edge extraction mask to a region containing a candidate of a physical object in the multi-value image and detects multiple horizontal edges in the multi-value image within the first edge extraction mask. The apparatus further comprises a head upper end detection device that detects a position of a horizontal edge with the maximum edge intensity out of the multiple horizontal edges as a position of an upper end of a head of the physical object in the multi-value images within the first edge extraction mask, a vertical edge detection device that applies a second edge extraction mask extending downwards from the position of the upper end of the head of the physical object in the multi-value images and detects multiple vertical edges in the multi-value images within the second edge extraction mask, and a head lower end detection device that detects a position of a lower end of the head of the physical object based on a positional variation of the multiple vertical edges in the multi-value images within the second edge extraction mask. The apparatus also comprises a head region identification device that identifies a head region of the physical object in the multi-value images based on the space between the position of the upper end of the head and the position of the lower end of the head of the physical object, and a physical object determination device that determines whether the physical object is a specified physical object to be monitored based on the multi-value images containing the at least head region of the physical object.

According to the present invention, accurate detection of the head region of the physical object (e.g., a pedestrian) in the image is achieved with improved precision, without using information on the distance between the vehicle and the physical object to be monitored.

According to one embodiment of the present invention, the imaging device is a single infrared camera, and comprises a distance calculation device that calculates the distance between the vehicle and the physical object to be monitored in a real space based on the size of the specified physical object to be monitored in the multi-value images, or on a temporal change of the size.

According to one embodiment of the present invention, accurate detection of the head region of the physical object in the image is achieved even when a single infrared camera is used. Furthermore, the invention allows calculation of the distance between the vehicle and the physical object to be monitored in a real space.

DESCRIPTION OF EMBODIMENTS

Figure 1:
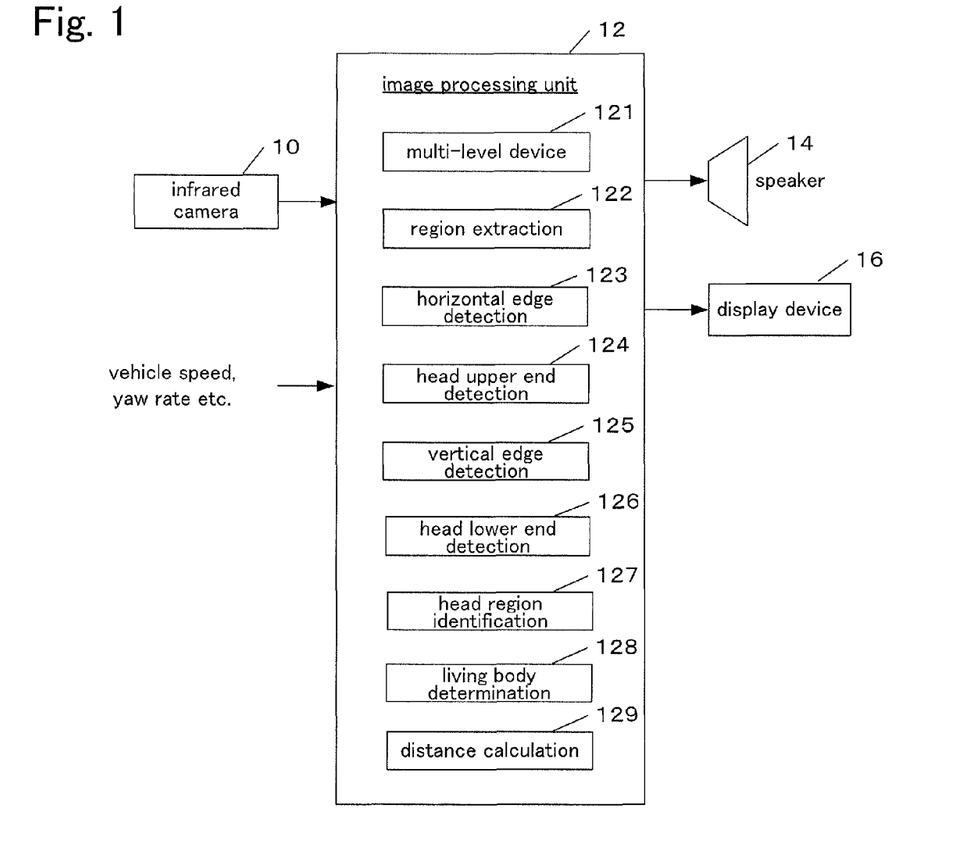
FIG. 1 is a block diagram showing a configuration of a vehicle surroundings monitoring device according to one embodiment of the present invention.

Now, embodiments of the present invention will be described with reference to the attached drawings. FIG. 1 is a block diagram showing a configuration of a vehicle surroundings monitoring device according to one embodiment of the present invention. The surroundings monitoring device includes an image processing unit 12 which is mounted on a vehicle and detects a physical object around the vehicle based on image data captured by an infrared camera 10, a speaker 14 for issuing a warning by sound or by voice based on the results detected by the image processing unit 12, and a display device 16 which displays an image captured by the infrared camera 10 and presents a display to let the driver aware of presence of the physical object around the vehicle.

Note that in a vehicle equipped with a navigation system, corresponding functions that the navigation system have may also be used as the speaker 14 and the display device 16. Further, the number of the infrared camera 10 is not necessarily limited to one, but rater two or more cameras may be used. Moreover, a camera (a CDD camera etc.) which utilizes another waveband (visible light etc.) may be used in place of the infrared camera 10.

The image processing unit 12 shown in FIG. 12 has functions indicated by blocks 121 to 129. The image processing unit 12 acts as a multi-value transformer (digitizer) 121 that transforms grayscale image obtained by the infrared camera 10 to multi-value image. It also performs the function of a region extraction device 122 that extracts a region containing candidates of the physical object in the multi-value image. A horizontal edge detecting device 123 applies a first edge detection mask to the extracted region to detect multiple horizontal edges in the image within the first edge extraction mask. A head upper end detection device 124 detects, as the position of an upper end of a head of the physical object, the position of the horizontal edge that has a maximum edge intensity out of the multiple horizontal edges in the image within the first edge extraction mask. A vertical edge detection device 125 applies a second edge extraction mask extending downwards from the position of the upper end of the head of the physical object to detect multiple vertical edges in the multi-value image within the second edge extraction mask. A head lower end detection device 126 detects the position of the lower end of the head of the physical object based on the positional variation of the multiple vertical edges in the image within the second edge extraction mask.

The image processing unit 12 further acts as a head region identifying device 127 that identifies the head region of the physical object in the multi-value image based on the space between the position of the upper end of the head of the physical object and the position of the lower end of the head. A physical object identification device 128 identifies based on the multi-value image containing at least the head region of the physical object whether the physical object is a specified physical object to be monitored. A distance calculation device 129 that calculates the distance between the vehicle and the physical object to be monitored in a real space based on a size of the specified physical object to be monitored on the multi-value image and a temporal change of the size.

The image processing unit 12 further has a function of executing necessary processes upon receipt of detection signals from sensors such as a speed sensor detecting a speed (a vehicle speed) of an own vehicle, a brake sensor, and a yaw rate sensor detecting a yaw rate (a change rate of rotation angle in a turning direction).

The function of each block is implemented by a computer (CPU) in the image processing unit 12. The image processing unit 12 may of course be built in the navigation system.

The image processing unit 12 includes, as a hardware configuration, devices such as an A/D conversion circuit for converting input analog signals into digital signals, an image memory for storing digitized image signals, a central processing unit (CPU) for executing various arithmetic processes, a RAM used for temporarily storing data when the CPU executes arithmetic processes, a ROM for storing a program to be executed by the CPU and data (including a table and a map, etc.), and an output circuit for outputting signals that include driving signals to the speaker 14 and display signals to the display device 16. Output signals from the infrared camera 10 are converted into digital signals and are input to the CPU.

Figure 2:
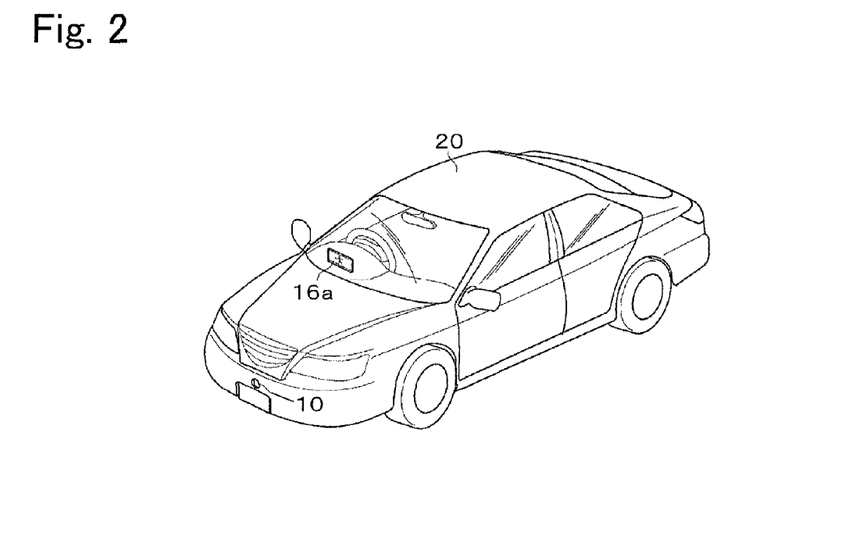
FIG. 2 is a view for explaining a mounting position of an infrared camera according to one embodiment of the present invention.

FIG. 2 is a view explaining a mounting position of the infrared camera 10 shown in FIG. 1 according to one embodiment of the present invention. As shown in FIG. 2, the infrared camera 10 is disposed at the center in a vehicle width direction on a front bumper of the vehicle 20. The infrared camera 10 has the properties that the higher the temperature of an object, the higher the level of its output signal (brightness increases). A reference numeral 16*a* shown in FIG. 2A denotes an exemplary case where a head up display (hereinafter referred to as a "HUD") is used as the display device 16. As shown in FIG. 2, the HUD 16*a* is provided so as to display a display screen at a position where a driver's front field of view through a front window shield is not obstructed.

Figure 3:
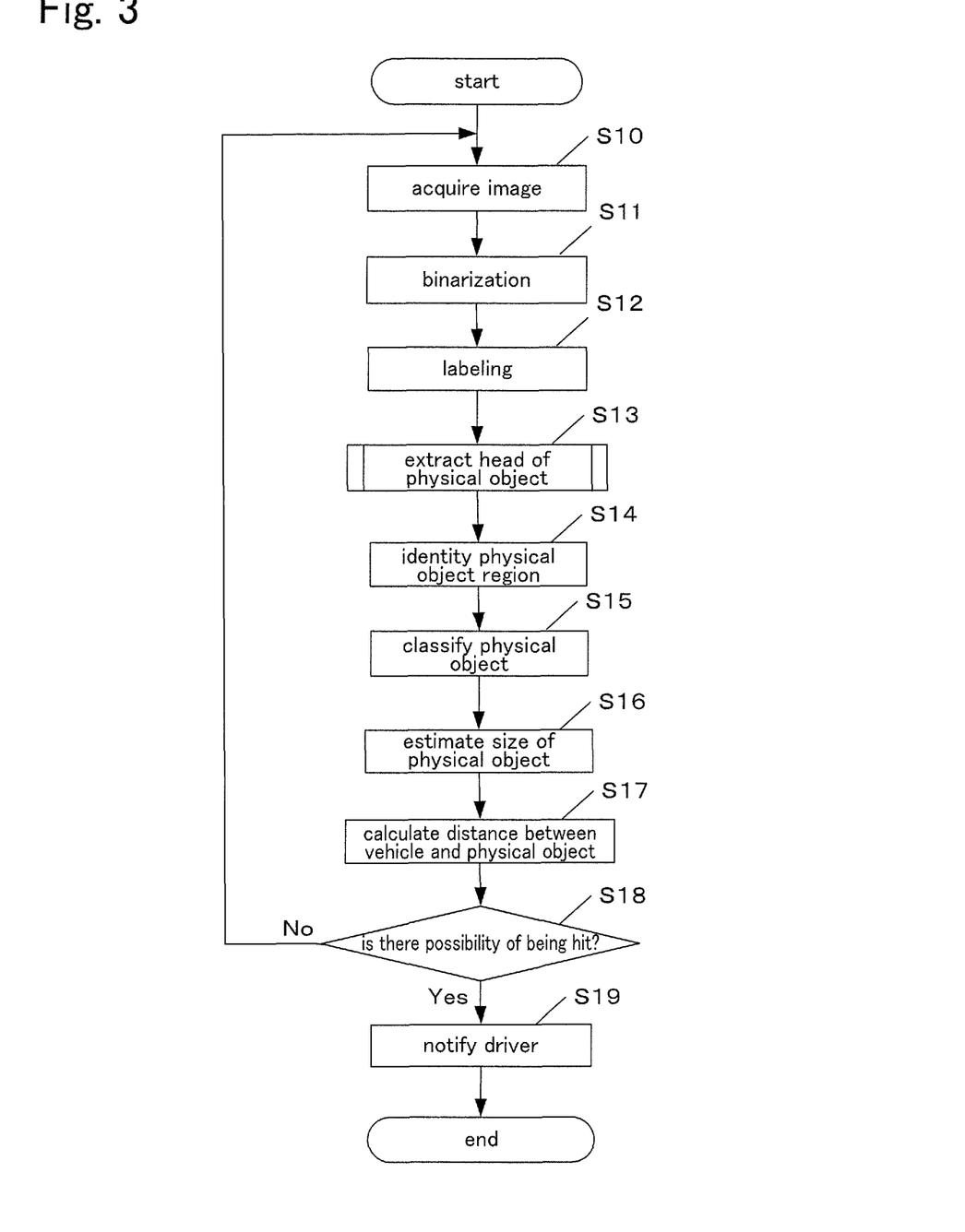
FIG. 3 is a processing flow executed in an image processing unit according to one embodiment of the present invention.

FIG. 3 is a process flow to be executed by the image processing unit 12 according to one embodiment of the present invention. This process flow is executed by the CPU of the image processing unit 12 at specified time intervals by invoking a processing program stored in the memory. Explanation is made here by giving an example where an acquired grayscale image is transformed into a binary image to generate a monochrome image. But, the invention is not limited thereto, and multi-value image with three or more levels may also be used. In that case, with the increased number of threshold values, multi-value images may be produced by executing similar processes as with the binary transformation.

In step S10, output signals produced frame by frame by the infrared camera 10 are received as input analog signals of the infrared image and a digital grayscale image is produced by A/D conversion, which is stored in the memory.

In step S11, binary transformation process, wherein a pixel having brightness higher than a threshold is given "1(white)" and a pixel having brightness lower than the threshold is given "0(black)", is applied to the obtained grayscale image. The binary image corresponding to the grayscale image is stored for each captured frame.

In step S12, labeling process is executed in which "1" (white) of the binary image is converted into run length data for each scanning line in the x direction (the horizontal direction). A line having a portion on top of another in the y direction is regarded as belonging to a physical object, and a label is attached to a circumscribing rectangle of the physical object to treat it as a candidate region for the physical object.

Figure 4:
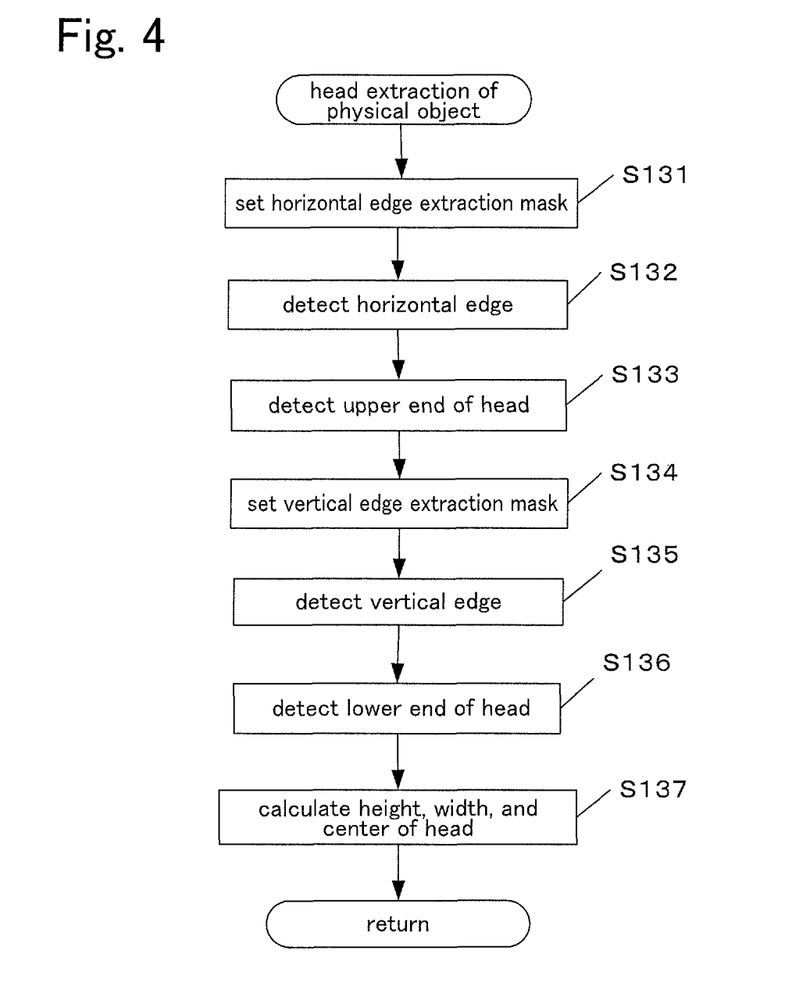
FIG. 4 is a processing flow of extracting a head of a physical object according to one embodiment of the present invention.

In the next step S13, a routine to extract a head of the physical object is executed for the image within the physical object candidate region obtained in step S12. FIG. 4 is a view showing a routine (a process flow) to extract the head of the physical object.

Figure 5:
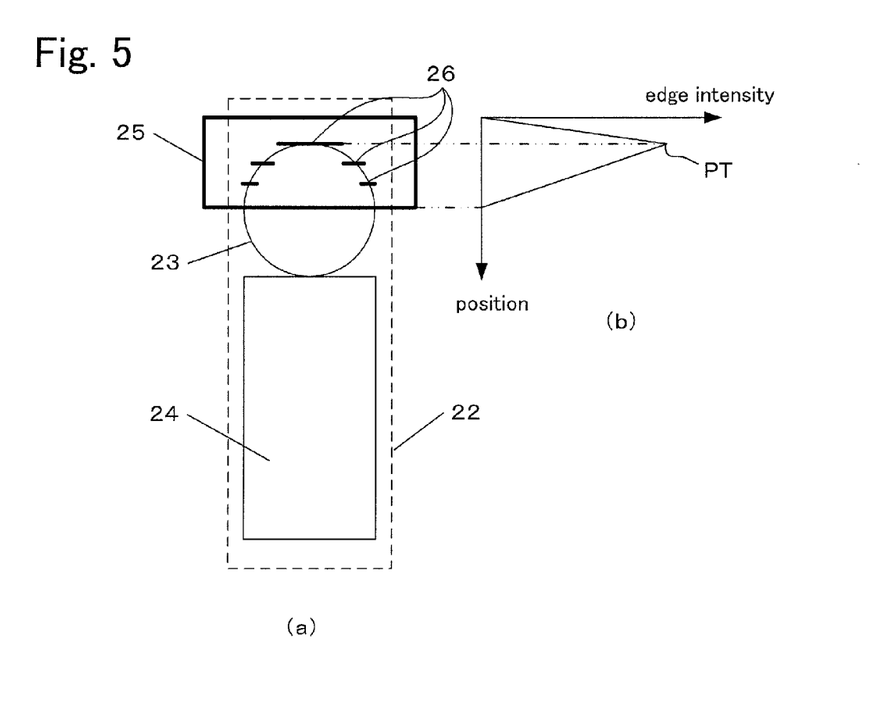
FIG. 5 is a view explaining application of a horizontal (first) edge extraction mask according to one embodiment of the present invention.

In step S131 shown in FIG. 4, an edge extraction mask for extracting a horizontal edge is applied to the image containing the physical object candidate region. FIG. 5 is a view explaining how to apply the edge extraction mask. FIG. 5(*a*) illustrates a binary image containing the physical object candidate region 22. In FIG. 5(*a*), there is an image of a physical object that looks like a human body (a pedestrian) within the physical object candidate region 22. The physical object includes two parts consisting of a head 23 and a body 24. The edge extraction mask 25 is applied. Specifically, a edge filter having a noise-erasing function, such as Sobel and Prewitt etc., is applied to the image (pixels) within the edge extraction mask 25.

In step S132, horizontal edges 26 in the image within the edge extraction mask 25 is detected. The detection of the horizontal edge is done by determining whether an output value from the edge filter is larger than a specified threshold using a conventional method. In step S133, a pixel position having a highest edge intensity out of the horizontal edges 26 is detected as the position of the upper end of the head. In the example shown in FIG. 5, a position of a point PT shown in FIG. 5(b) is the position of the upper end of the head 23. In this way, according to one embodiment of the present invention, the position of the upper end of the head of the physical object is determined from among the horizontal edges (their edge intensity) detected within the edge extraction mask.

Figure 6:
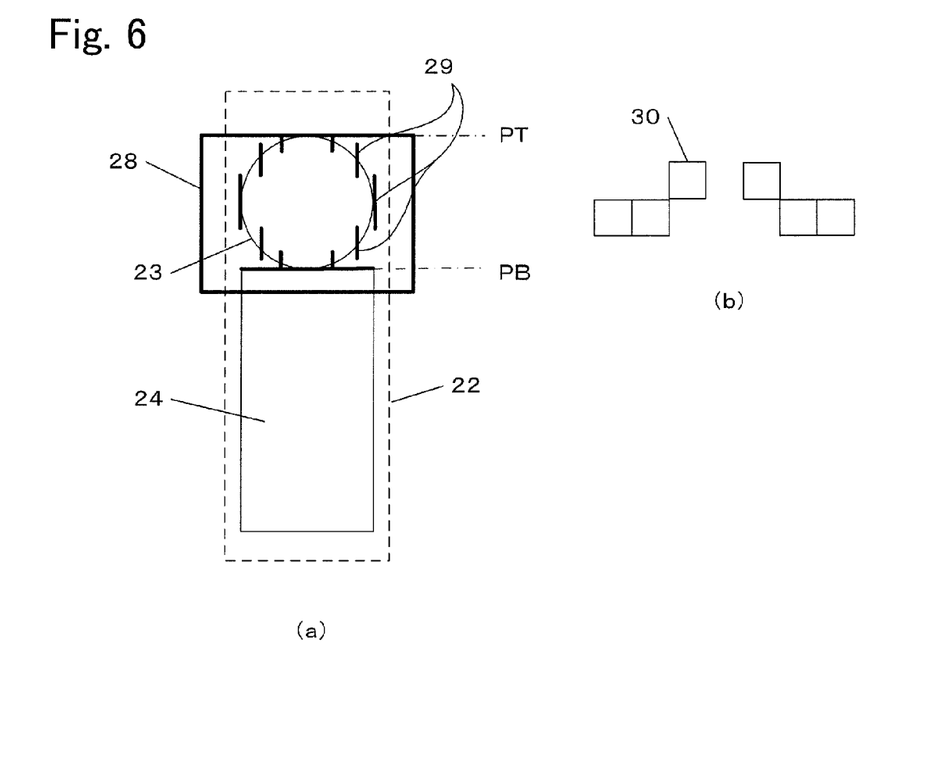
FIG. 6 is a view explaining application of a vertical (second) edge extraction mask according to one embodiment of the present invention.

In step S134, the edge extraction mask for detecting vertical edges is applied to the image in the physical object candidate region. FIG. 6 is a view explaining how to apply the edge extraction mask. FIG. 6(a) illustrates a binary image containing the physical object candidate region similar to FIG. 5(a). The edge extraction mask 28 is a mask extending downwards from the position PT of the upper end of the head 23 detected in step S133. Specifically, a filter for extracting difference of brightness that is larger than a specified level is applied to the image (pixels) within the edge extraction mask 28. Noise components may be removed, if necessary.

In step S135, vertical edges 29 in the image within the edge extraction mask 28 are detected. The detection of a vertical edges are done by determining whether an output value from the edge filter is larger than a specified threshold using a conventional method. In step S136, if positional variation of the pixels of the vertical edges 29 matches a predetermined pattern, the pixel position is detected as the position of the lower end of the head 23. In the example shown in FIG. 6, if the positional variation of the pixels in a lower part of the head 23 matches the pattern illustrated in FIG. 6(b) that extends over more than two pixels in both sides, the pixel position is detected as the position PB, the lower end of the head 23. In FIG. 6(b), one region (a rectangle) denoted by a reference numeral 30 indicates one pixel. It is to be noted that the pattern shown in FIG. 6(b) is merely an example, and any pattern with which the position of the lower end of the head 23 is extractable may be adopted as a specified pattern. Thus, according to one embodiment of the present invention, the position of the lower end of the head (the shoulder) of the physical object is determined from the positional variation (pattern) of the pixels containing the vertical edges detected within the edge extraction mask.

Figure 7:
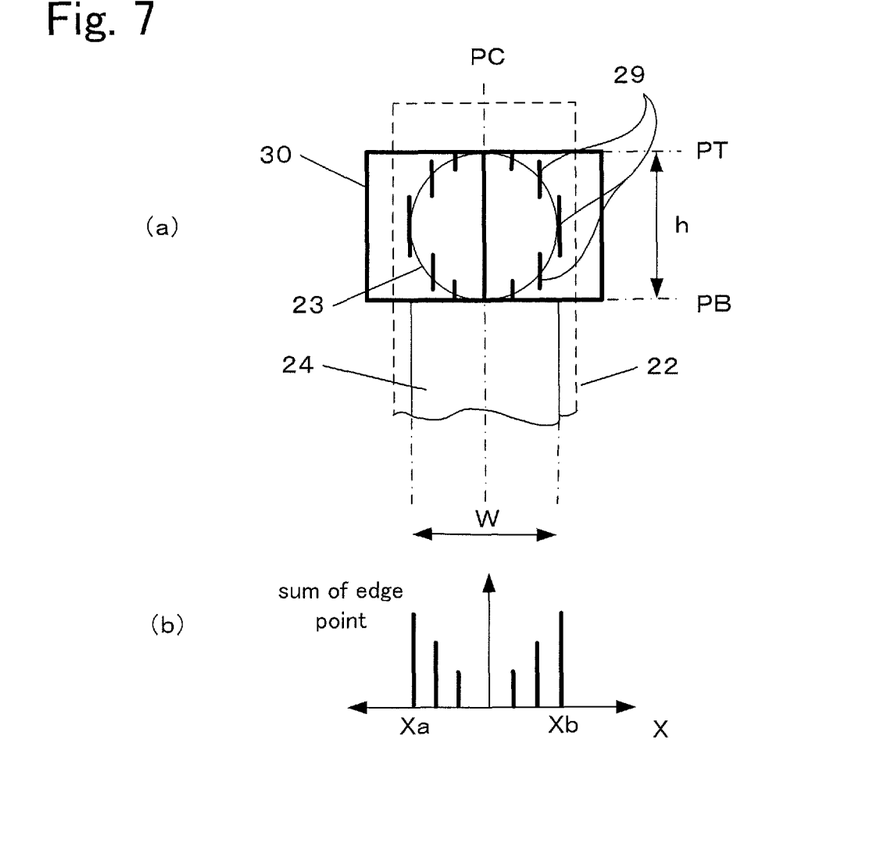
FIG. 7 is a view explaining a height, a width, and a center position of a head according to one embodiment of the present invention.

In step S137, height, width, and central position of the head 23 are calculated. FIG. 7 is a view explaining how to calculate height, width, and central position of the head 23. In FIG. 7, the mask region 30 is set to the region identified by the detected upper end PT and the lower end PB of the head 23. The height of the head 23 is calculated as the height of the mask region 30, which is calculated as the space "h" between the upper end PT and the lower end PB of the head 23.

Vertical edges 29 are then detected within the set mask region 30. Discontinuous edge pixels are regarded as noise and are removed. The number of pixels forming a continuous edge is calculated for each position on X line, and the edge having a larger number of pixels than a threshold are determined to be the end of the head, whereby the width of the head is calculated as the space of the two side ends of the head. More specifically, the mask region 30 is divided into two regions of right and left, and a search is made for each region from the outside toward the inside. The first pixel position where a sum of edge points exists and where a predetermined condition is met is determined to be an end of the head. In the example shown in FIG. 7, positions Xa and Xb shown in FIG. 7(b) are the two ends of the head 23. The space between the two ends is the head width W. The central position of the head 23 is a central pixel position of the head width W. In the example shown in FIG. 7, the position denoted by reference numeral PC is the central position.

Thus, according to one embodiment of the present invention, accurate detection of the size (the upper end, the lower end, the height, and the width) of the head region of the physical object may be achieved without using information about the distance between the vehicle and the physical object (e.g., a pedestrian).

Returning to FIG. 3, the region of the physical object is identified in step S14. In the case of the physical object candidate shown in FIGS. 5 to 7, for example, a mask region extending downwards from the position PT of the upper end of the head detected in step S13 is set. Then, a search is done by sequentially scanning pixel values downwards from the position PB of the lower end of the head and from the left side toward the right side within the mask region. If a "0" pixel of a dark region continues in succession, the scanned part is determined to be a boundary between physical object candidates 23 and 24 in the image and a road surface, and the boundary position is regarded as the lower end PF of the physical object. In this connection, the upper end of the physical object is the position PT of the upper end of the head. The region between the positions PT and PF is identified as the physical object region.

In step S15, a class of the physical object is determined. For example, whether the candidate for a physical object belongs to a specific physical object such as a pedestrian is determined. Determination is performed as follows according to a conventional scheme. If a pedestrian is a target, whether the candidate for a physical object matches specific characteristics (head, foot, etc.) of a pedestrian is determined, or a conventional pattern matching is used to calculate a similarity with a pre-stored specified pattern representative of a pedestrian to determine whether the physical object candidate is a pedestrian.

In step S16, the size of the physical object is estimated. Taking the pedestrian as an example, a ratio $Ri(Ri=H/W)$ of the height H and the head width W of a candidate for a pedestrian in the binary image is first calculated. With reference to a table of the ratio R stored in the memory, that is a table showing the relation between the ratio R, the height of a human body and the width of the head in the real space, the height HT in the real space (height of a human body in the real space) is estimated (calculated) for the calculated ratio Ri ($R=Ri$).

In step S17, the distance between the vehicle and the physical object is calculated. Specifically, taking the pedestrian as an example, a distance Z to the physical object candidate in the real space is calculated according to the following equation (1), using the height HT in the real space estimated in step S16, the height H (length=number of pixel×length of pixel) of the image, and a focal length F. Note that the equation (1) is a formula for computation when it is assumed that an average height of the pedestrian is about 170 cm.

$$Z = HT \times F / H \qquad \text{equation (1)}$$

In step S18, from the grayscale image and the binary image obtained in sequence frame by frame, a moving body (an object in motion) of the portion in the image having high temperature is detected as a physical object such as a pedestrian, and a motion vector (speed and direction) of the moving body is detected. In step S18, likelihood that the vehicle contacts the physical object (a pedestrian) is determined on the basis of a used brake magnitude, a vehicle speed, and a yaw rate respectively obtained from a brake sensor, a speed sensor, and a yaw rate sensor, as well as the distance Z to the physical object calculated in step S17. When contact is determined to be likely in step S19, it is notified to the driver. Specifically, the grayscale image of the pedestrian is displayed on the display device 16 (HUD 16a), and at the same time a warning is issued through the speaker 14 to notify the possible contact to the driver to prompt the driver to take an action to avoid the possible contact.

While the description is made as stated above to the embodiment of the present invention, the invention is not limited to such embodiment. Rather, the present invention may be modified within the limits of not departing from the scope of the present invention.

Alternatively, for example, information on the head (a width and the center, etc.) of the physical object may be calculated using a conventional brightness profile on the grayscale image, and the information on the head of the physical object may be compared with the information on the head detected by using edges on the binary image according to the aforesaid embodiment of the present invention. After that, a distance between the vehicle and the physical object may be calculated, and a possibility of contact may be determined after reliability of the latter information is confirmed. Thus, improvement of precision in monitoring the physical object presenting around the vehicle and accordingly precision of the informing given to the driver may be achieved.

REFERENCE SIGNS LIST

10: infrared camera
12: image processing unit
14: speaker
16: display device
16a: HUD
20: vehicle

The invention claimed is:

1. An apparatus for monitoring surroundings of a vehicle, comprising: an imaging device that is mounted on a vehicle and captures an image around the vehicle; and an image processing unit having a processor and a memory; wherein the image processing unit is configured to: transform a grayscale image acquired by the imaging device to a multi-value image; detect an upper end of a head of a physical object in the multi-value image by determining a horizontal edge having a maximum edge intensity in a region of a first edge extraction mask applied to the multi-value image; detect multiple vertical edges in the multi-value image by applying a second edge extraction mask extending downwards from the detected upper end of the head of the physical object; detect a lower end of the head of the physical object based on a positional variation of the detected multiple vertical edges; and to identify a head region of the physical object based on a space between the upper end of the head and the lower end of the head of the physical object.

2. The apparatus according to claim 1, wherein the imaging device is a single infrared camera, and the image processing unit is further configured to: calculate a distance between the vehicle and the physical object in a real space based on a size of the head of the physical object in the multi-value image and a focal length of the infrared camera.

3. The apparatus according to claim 2, wherein the image processing unit is further configured to: determine a possibility that the vehicle contacts the physical object based on at least one of the calculated distance, a vehicle speed, and a yaw rate of the vehicle.

4. The apparatus according to claim 1, wherein the image processing unit is further configured to: apply an intensity profile to the grayscale image of the detected head region to produce information about the head; and to determine reliability of the detection of the head in the light of the information produced from the intensity profile.

5. The apparatus according to claim 1, wherein the lower end of the head is detected when the positional variation of a pixels of the detected vertical edges matches a predetermined pattern.

6. An apparatus for monitoring surroundings of a vehicle, comprising: an imaging means mounted on a vehicle for capturing an image around the vehicle; means for transforming a grayscale image acquired by the imaging device to a multi-value image; means for detecting an upper end of a head of a physical object in the multi-value image by determining a horizontal edge having a maximum edge intensity in a region of a first edge extraction mask applied to the multi-value image; means for detecting multiple vertical edges in the multi-value image by applying a second edge extraction mask extending downwards from the detected upper end of the head of the physical object in the multi-value image; means for detecting a lower end of the head of the physical object based on a positional variation of the detected multiple vertical edges in the multi-value image; and means for identifying a head region of the physical object in the multi-value image based on a space between the detected upper end of the head and the detected lower end of the head of the physical object.

7. The apparatus according to claim 6, wherein the imaging means is a single infrared camera, and the apparatus further comprising: means for calculating a distance between the vehicle and the physical object in a real space based on a size of the head of the physical object in the multi-value image and a focal length of the infrared camera.

8. The apparatus according to claim 7, further comprising: means for determining a possibility that the vehicle contacts the physical object based on at least one of the calculated distance, a used brake magnitude, a vehicle speed, and a yaw rate of the vehicle.

9. The apparatus according to claim 6, wherein the lower end of the head is detected when the positional variation of a pixels of the detected vertical edges matches a predetermined pattern.

10. A method of monitoring surroundings of a vehicle, comprising: capturing an image around the vehicle with an imaging device mounted on the vehicle; transforming a grayscale image acquired by the imaging device to a multi-value image; detecting an upper end of a head of a physical object in the multi-value image by determining a horizontal edge having a maximum edge intensity in a region of a first edge extraction mask applied to the multi-value image; detecting multiple vertical edges in the multi-value image by applying a second edge extraction mask extending downwards from the detected upper end of the head of the physical object in the multi-value image; detecting a lower end of the head of the physical object based on a positional variation of the detected multiple vertical edges in the multi-value image; and identifying a head region of the physical object in the multi-value image based on a space between the upper end of the head and the lower end of the head of the physical object.

11. The method according to claim 10, wherein the imaging device is a single infrared camera, and the method further comprises: calculating a distance between the vehicle and the physical object in a real space based on a size of the head of the physical object in the multi-value image and a focal length of the infrared camera.

12. The method according to claim 11, further comprising: determining a possibility that the vehicle contacts the physical object based on at least one of the calculated distance, a used brake magnitude, a vehicle speed, and a yaw rate of the vehicle.

13. The method according to claim 10, wherein the lower end of the head is detected when the positional variation of a pixels of the detected vertical edges matches a predetermined pattern.

\* \* \* \* \*